United States Patent [19]
Hashizume et al.

[11] Patent Number: 5,766,334
[45] Date of Patent: Jun. 16, 1998

[54] COLORED TITANIUM FLAKES, PROCESS FOR THEIR PREPARATION AND RESIN COMPOSITION CONTAINING COLORED TITANIUM FLAKES

[75] Inventors: Yoshiki Hashizume, Kawachinagano; Satosi Kobayashi, Kobe; Michitaka Hanibuchi, Nabari, all of Japan

[73] Assignee: Toyo Aluminium K. K., Osaka, Japan

[21] Appl. No.: 658,649

[22] Filed: Jun. 5, 1996

[30] Foreign Application Priority Data

Jun. 5, 1995 [JP] Japan ................................ 7-162912

[51] Int. Cl.$^6$ ................................................ C09C 1/62
[52] U.S. Cl. .................... 106/403; 106/436; 524/413; 423/608; 423/610; 427/217; 427/218; 428/403
[58] Field of Search .......................... 106/403, 436, 106/437; 427/217, 218; 428/403; 524/413; 423/608, 610

[56] References Cited

U.S. PATENT DOCUMENTS 5,213,618  5/1993  Souma et al. ................... 106/403

FOREIGN PATENT DOCUMENTS

| 0328906 A3 | 1/1989 | European Pat. Off. |
| 41 04 310 A1 | 2/1991 | Germany . |
| 4-131309 | 5/1992 | Japan . |
| 4-314764 | 11/1992 | Japan . |
| WO91/04293 | 4/1991 | WIPO . |

OTHER PUBLICATIONS

Abstract for Japanese Patent Publication No. 04131309 A May 1992.

Abstract for Japanese Patent Publication No. 04314764 A Nov. 1992.

*Primary Examiner*—Michael Marcheschi
*Attorney, Agent, or Firm*—Knobbe, Martens, Olson & Bear, LLP

[57] ABSTRACT

A colored titanium flake having a flat, smooth surface, the flake including a coherent oxide layer formed on its surface, and the thickness of the coherent oxide layer being 100 to 1000 Å, a process for preparing the colored titanium flakes and a resin composition containing the colored titanium flakes.

15 Claims, 2 Drawing Sheets

COLORED TITANIUM FLAKES, PROCESS FOR THEIR PREPARATION AND RESIN COMPOSITION CONTAINING COLORED TITANIUM FLAKES

TECHNICAL FIELD

The present invention relates to colored titanium flakes, a process for preparing them and a resin composition containing the colored titanium flakes.

BACKGROUND ART

Conventionally aluminum flakes have been used in metallic finish for the surface of metals and the like. To color the finish, a colored pigment has been incorporated into a coating composition. In this case, there arises a problem that since the color of achromatic aluminum flakes is prominent, a vivid color can not be obtained.

Flaky colored pigments such as mica have been used in place of aluminum flakes. In this case, a pearlescent distinctive color can be obtained, but the pigment raises problems of low hiding power and difficulty in producing a metallic glossy effect. The same problems are entailed when a metallic pigment is used as kneaded with a resin to give a decorative effect.

To obviate or alleviate the problems, a coloring process has been proposed which comprises depositing a pigment on individual aluminum flakes by a resin-coating method or the like (e.g. Japanese Unexamined Patent Publication (PCT) Hei 5-508424). However, the proposed process encounters difficulty in depositing a sufficient amount of a pigment on aluminum flakes, failing to provide a vivid color. Even if a sufficient amount of pigment has been deposited, the pigment would be likely to easily come off, resulting in loss of chromatic color.

Japanese Unexamined Patent Publication Hei 4-314764 discloses a method wherein titanium flakes are treated with nitride to provide gold-colored flakes. This method can color titanium flakes, but can produce only a gold color.

It is known to oxidize parts made of titanium or titanium alloy by anodic oxidation in order to give gold, blue, purple or like colors. But the method can not color fine titanium flakes for a technical reason.

A method is also known wherein stainless steel flakes formed by liquid-quenching process are colored by thermal oxidation. However, since the stainless steel flakes made by such process are thick and high in specific gravity, the flakes, if present in a coating or the like, would tend to form a hardly dispersible deposit after precipitation, posing a problem from the viewpoint of practical use.

A method of coloring titanium by oxidation in the air is known and may be proper if employable for titanium flakes. Yet, the thus colored titanium flakes which can be put to practical use have not been produced unlike stainless steel flakes. Because such colored titanium flakes have a high activity, a reaction can not be easily controlled by fine adjustment of an oxygen amount required for uniform color development, and such titanium flakes involve risks of ignition and explosion.

The primary object of the present invention is to provide a novel metallic pigment which is free of the problems associated with conventional colored metallic pigments, such as the removal of color, lack of vivid color, reduced gloss, etc., the metallic pigment being capable of producing other colors than a gold color and being usable for various purposes, e.g. for coating compositions or as pigments.

SUMMARY OF THE INVENTION

The inventors of the present invention conducted research to overcome the foregoing prior art problems and found that the desired colored titanium flakes can be obtained by grinding a titanium powder under specific conditions to give titanium flakes expanded with substantially no fracture, and heating the obtained flakes in an oxygen-containing atmosphere to form on their surface an oxide layer corresponding to a specific oxygen content.

According to the present invention, there are provided the following colored titanium flakes, processes for preparing them and resin compositions containing the colored titanium flakes.

1. A colored titanium flake having a flat, smooth surface, the flake including a coherent oxide layer formed on its surface, and the thickness of the coherent oxide layer as calculated from the specific surface area of the layer and the oxygen content of the flake being 100 to 1000 Å.

2. A colored titanium flake according to item 1 which has an average thickness of 0.1 to 1.0 μm and an average particle size of 5 to 50 μm.

3. A colored titanium flake according to item 2 which has an oxygen content of 1 to 5% by weight, a nitrogen content of up to 0.2% by weight, and a specific surface area of 0.2 to 1.0 m²/g.

4. A process for preparing the colored titanium flakes of item 2, the process comprising the steps of placing titanium flakes with a flat, smooth surface having a specific surface area of 0.2 to 1.0 m²/g into a porous refractory container, and heating the flakes at 250° to 500° C., preferably 300° to 400° C. in an atmosphere having a partial pressure of oxygen adjusted to 0.01 to 0.15 atm. as calculated in a normal state in order to form a coherent oxide layer on the flake surface.

5. A resin composition for moldings, coatings or inks, the composition containing the colored titanium flakes according to item 2 or 3.

6. A colored titanium flake according to item 1 which has an average thickness of 1 to 10 μm, an average particle size of 10 to 1000 μm, and an aspect ratio (average particle size/average thickness of flakes) of from 2 to 50.

7. A colored titanium flake according to item 6 which has an oxygen content of 0.4 to 5% by weight, a nitrogen content of up to 0.2% by weight, and a specific surface area of 0.05 to 0.5 m²/g.

8. A process for preparing the colored titanium flakes of item 6, the process comprising the steps of placing titanium flakes with a flat, smooth surface having a specific surface area of 0.05 to 0.5 m²/g into a porous refractory container, and heating the flakes at 250° to 500° C. in an atmosphere having a partial pressure of oxygen adjusted to 0.01 to 0.15 atm. as calculated in a normal state in order to form a coherent oxide layer on the flake surface.

9. A resin composition for moldings which contains the colored titanium flakes according to item 6 or 7.

DETAILED DESCRIPTION OF THE INVENTION

Figure 1:
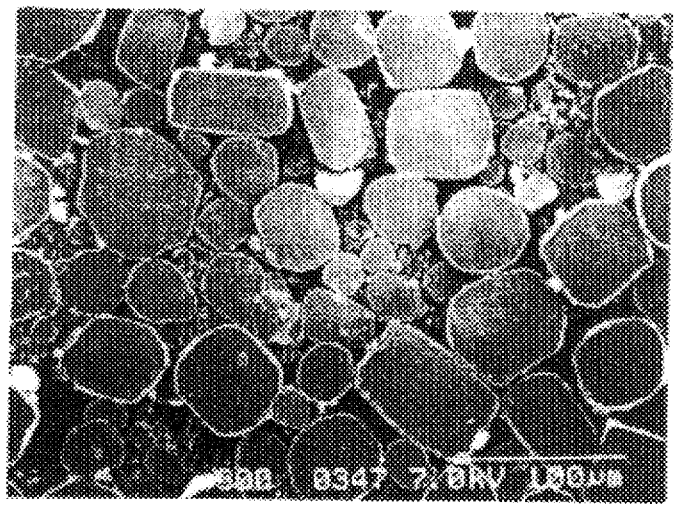
FIG. 1 is a scanning electron microphotograph showing the shape of flaky titanium obtained in Example 1 and the state of its surface.

The subject matter of item 1 described above is hereinafter referred to as "first invention", the subject matter of items 2 to 7 described above is hereinafter referred to as "second invention", and the subject matter of items 8–9 described above is hereinafter referred to as "third invention". The subject matter which is in common with the 1st, 2nd and 3rd inventions is hereinafter called simply "present invention".

1. First Invention

The colored titanium flakes of the first invention have a flat, smooth surface and include a coherent oxide layer on its surface. The thickness of the coherent oxide layer as calculated from the specific surface area of the layer and the oxygen content of the flake is usually about 100 to about 1000 Å.

The coherent color of the coherent oxide layer is changeable according to the layer thickness, and the color of titanium flakes can be changed to a gold, reddish purple, purple, blue, green or like colors according to the Hunter's diagram.

The thickness of the coherent oxide layer is about 100 to about 1000 Å, preferably 100 to 500 Å, and can be selected depending on the purpose or other factors. However, when the oxide layer is less than 100 Å in thickness, a coherent color is not obtainable, whereas when the oxide layer is above 1000 Å in thickness, the metallic gloss is lost.

2. Second Invention

Among the titanium flakes of the first invention, the flakes having an average thickness of 0.1 to 1.0 μm (preferably about 0.5 to about 1.0 μm) and an average particle size of 5 to 50 μm (preferably about 10 to about 30 μm) fall within the category of the second invention. The term "average particle size of titanium flakes" used herein refers to a volume mean diameter as calculated from the particle size distribution as measured by laser diffraction.

When titanium flakes are too thick, the obtained colored titanium flakes have a low hiding power and would be likely to form hard cake on precipitation when used in a coating composition, an ink composition or the like. Titanium flakes of too large an average particle size, when mixed with a resin (e.g., to give a coating composition), would protrude from the surface of the composite body (coating film), which impairs the appearance of the body. Titanium flakes of less than 0.1 μm in average thickness or less than 5 μm in average particle size have such a high reactivity that the flakes are hazardous in handling and it is difficult to control the oxidation reaction.

Preferred flakes of the second invention have an oxygen content of 1 to 5% by weight, a nitrogen content of up to 0.2% by weight and a specific surface area of 0.2 to 1.0 m$^2$/g.

The titanium flakes with an oxygen content of less than 1% by weight are chemically unstable in the surface and involve risks of ignition or dust explosion during handling, whereas titanium flakes with an oxygen content of more than 5% by weight show reduced luster and have decreased utility as a colored pigment.

Preferably the nitrogen content in colored titanium flakes is adjusted to less than 0.2% by weight. In the case of the nitrogen content of more than 0.2% by weight, the flakes are turbid due to the presence of nitride and do not give a good appearance to the end product when admixed with a resin.

Titanium flakes with a specific surface area of less than 0.2 m$^2$/g are low in metallic luster and in hiding power, whereas those of more than 1.0 m$^2$/g in specific surface area have a high reactivity and thus are difficult to uniformly color by oxidation. The thickness of the oxide layer in the present invention is a value as calculated from the specific surface area of the layer and the oxygen content of the flake.

The colored titanium flakes of the second invention can be prepared by the following process. The process gives titanium flakes having properties different from those of conventional titanium flakes.

First, titanium particles of about 1 to about 30 μm in average particle size, preferably spherical atomized titanium particles of about 3 to about 20 μm in average particle size, are ground by a wet ball milling or the like in the presence of a grinding or crushing liquid medium (hereinafter referred to as "grinding liquid medium") or a grinding or crushing aid (hereinafter referred to as "grinding aid").

Useful grinding liquid mediums include, for example, aliphatic hydrocarbons, aromatic hydrocarbons and the like which have a boiling point of about 100° to about 200° C. More specific examples of such mediums are mineral spirits, n-paraffin, naphtha, etc. and mixtures thereof.

Examples of useful grinding aids are oleic acid, capric acid, caprylic acid, lauric acid, myristic acid, palmitic acid, stearic acid and like fatty acids; oleylamine, laurylamine, dilaurylamine, stearylamine, distearylamine and like aliphatic amines; oleyl alcohol, lauryl alcohol, stearyl alcohol and like aliphatic alcohols; oleyl acid phosphate, 2-ethylhexyl acid phosphate, lauryl acid phosphate, stearyl acid phosphate and like acidic phosphates, and mixtures thereof.

A suitable volume ratio of grinding liquid medium:grinding aid:titanium particles used as the starting material is approximately 1:5–30:0.005–0.1. A lesser amount of the grinding liquid medium used causes the fracture of titanium particles prior to extension thereof, failing to provide titanium particles in the desired form, whereas too large an amount of the grinding liquid medium used reduces the grinding efficiency, making it difficult to economically put the flakes to practical use. A lesser amount of the grinding aid used decreases the grinding efficiency, resulting in fracture of titanium particles prior to extension thereof, whereas an excessive grinding aid used remains in the titanium flakes, thereby adversely affecting the oxidation (contamination of furnace, formation of carbide, etc.).

The type, structure and operational conditions of useful ball mills, and the kind and amount of useful balls are properly selected so as to produce titanium flakes having an average thickness of 0.1 to 1.0 μm (preferably about 0.5 to about 1.0 μm), an average particle size of about 5 to about 50 μm (preferably about 10 to about 30 μm), and a specific surface area of about 0.2 to about 1.0 m$^2$/g. The selection is preferably made to fulfill the following equation (1):

Grinding time (hr)×(revolution of ball mill (rpm)/critical revolution (rpm)×(weight of ball (kg)/amount of titanium particles used as the starting material (kg))=300 to 3,000         (1)

Then, the titanium flakes obtained above are heated at a temperature of about 250° C. to about 500° C., preferably about 300° C. to about 400° C., in a porous refractory container having a partial pressure of oxygen adjusted to 0.01 to 0.15 atm. as calculated in a normal state in order to form an oxide layer on the surface of titanium flakes, whereby the desired colored titanium flakes are produced.

Useful materials for producing the porous refractory container include, for example, alumina, mullite, silica, refractory brick, silicon nitride, zirconia, aluminum titanate, etc. Preferably the porous refractory container has a porosity of about 15 to about 60% and a pore size of about 0.5 to about 10 μm. The porosity and pore size of the porous refractory container affect the properties of colored titanium flakes finally obtained, operational efficiency, etc. For example, too low a porosity of the porous refractory container results in uneven oxidation treatment, whereas too high a porosity thereof leads to reduction in the strength of the container. Too small a pore size brings about uneven oxidation treatment, whereas too large a pore size may cause leakage of titanium flakes from the container.

Too low a partial pressure of oxygen within the porous refractory container fails to fully oxidize the titanium, whereas too high a partial pressure thereof makes the oxidation reaction uncontrollable, and induces irregular coloration of oxidized titanium.

The oxygen-containing atmosphere which can be used in the present invention includes, for example, air; a mixture of oxygen with an inert gas such as nitrogen, carbon dioxide, argon, helium, xenon or the like; oxygen-containing reduced-pressure atmosphere; etc. If use is made of a gas which can react with titanium like nitrogen, the lowest possible reaction temperature is preferably employed in order to inhibit the reaction of the titanium with the gas. It is desirable that the titanium flakes in one lot be uniformly oxidized by rotating the heating container or furnace or by agitating the titanium flakes.

A reaction temperature of lower than 250° C. results in insufficient oxidation of titanium flakes, whereas a reaction temperature of higher than 500° C. makes the oxidation reaction uncontrollable, possibly leading to uneven coloration and agglomeration of titanium flakes. The reaction time is properly selected depending on the reaction temperature and the like. Generally the reaction is carried out until the oxygen content of colored titanium flakes reaches about 1 to about 5% by weight (preferably about 1 to about 3% by weight) and the oxide layer gains a thickness of about 100 to about 1000 Å.

The colored titanium flakes according to the second invention are usually in the form of a powder having a very low apparent density. When required, the dispersibility of the flakes can be improved by adsorbing a surfactant on their surface as done for known inorganic powders. To facilitate handling, the flakes may be mixed with an organic solvent such as mineral spirits to form a paste. The titanium flakes of the present invention are suitable as a coloring component for resin compositions such as coating compositions, ink compositions or like resin-containing liquid formulations, and for resinous moldings.

The resin composition containing the titanium flakes of the second invention usually further contains at least one of components as exemplified below which have been used in conventional colored pigment-containing resin compositions:

1) resins such as acrylic resin, alkyd resin, polyester, polyurethane, polyethylene, polypropylene, polybutadiene, polycarbonate, ABS resins, polyvinyl acetate, polyvinyl chloride, etc.;

2) pigments and dyes such as phthalocyanine, quinacridone, isoindoline, perylene, azo lake, iron oxide, chrome yellow, carbon black, titanium oxide, pearl mica, etc.; and 3) additives such as solvents, surfactants, plasticizers, curing agents, UV absorbers, antistatic agents, thickeners, etc.

The amount of the titanium flakes in the resin composition is selected depending on the purpose of the resin composition. The amount is not specifically limited and is usually about 0.5 to about 20% by weight based on the weight of the composition. Excessive titanium flakes used degrades the properties of the resin composition used for the intended purpose.

3. Third Invention

Among the titanium flakes of the first invention, the flakes having an average thickness of 1 to 10 µm (preferably 2 to 5 µm), an average particle size of 10 to 1000 µm, (preferably 20 to 100 µm) and an aspect ratio (average particle size/average thickness of flakes) of from 2 to 50 fall within the category of the third invention. The coherent oxide layer of the third invention has a coherent color which is changeable according to the layer thickness, and the color of titanium flakes can be changed to a gold, reddish purple, purple, blue, green or like colors according to the Hunter's diagram.

When titanium flakes of the third invention are too thick, the obtained colored titanium flakes have a low hiding power. Titanium flakes of too large an average particle size, when mixed with a resin, would protrude from the surface of a molded body, thereby deteriorating the appearance of the body. Titanium flakes with an average thickness of less than 1 µm or an aspect ratio of higher than 50, when mixed with a resin, would give a molded product having a streaky flow pattern. Titanium flakes with an average particle size of less than 10 µm have poor luster, thus giving a low decorative effect. Hence they are undesirable to use. In the case of an aspect ratio of less than 2, the obtained molded product is low in metallic effect.

It is desirable in the third invention for the colored titanium flakes to have an oxygen content of 0.4 to 5% by weight, a nitrogen content of 0.2% or less and a specific surface area of 0.05 to 0.5 $m^2/g$.

The colored titanium flakes with an oxygen content of less than 0.4% by weight are chemically unstable in the surface and involve risks of ignition or dust explosion during handling, whereas flakes with an oxygen content of more than 5% by weight show reduced luster and have decreased utility as a colored pigment.

To prevent the turbidity of color due to the presence of nitride, the nitrogen content in colored titanium flakes is preferably limited to 0.2% or less.

Titanium flakes with a specific surface area of less than 0.05 $m^2/g$ is low in metallic luster and in hiding power, whereas those of more than 0.5 $m^2/g$ in specific surface area are high in reactivity and are therefore difficult to uniformly color by oxidation.

The colored titanium flakes of the third invention can be prepared by the following process which gives titanium flakes having properties different from those of conventional titanium flakes.

First, titanium particles of about 1 to about 30 µm in average particle size, preferably spherical atomized titanium particles of about 10 to about 20 µm in particle size are ground by wet ball milling in the presence of a grinding liquid medium and a grinding aid.

The same grinding liquid medium and the same grinding aid as used in the second invention are employed in the same amount.

The type, structure and operational conditions of useful ball mills, and the kind and the amount of useful balls are properly selected so as to produce titanium flakes having an average thickness of about 1 to about 10 µm (preferably about 2 to about 5 µm), an average particle size of about 10 to about 1000 µm (preferably about 20 to about 100 µm), a specific surface area of about 0.05 to about 0.5 $m^2/g$ and an aspect ratio (average particle size/average thickness of flakes) of from about 2 to about 50. The selection is preferably made to fulfill the following equation (2):

Grinding time (hr)×(revolution of ball mill (rpm)/critical revolution (rpm)×(weight of ball (kg)/amount of titanium particles used as the starting material (kg))=30 to 300   (2)

Then, the titanium flakes obtained above are heated in an oxygen-containing atmosphere in the same manner as in the second invention to form an oxide layer on the surface of flakes, whereby the desired colored titanium flakes are produced.

Generally the reaction for the oxidation of titanium flakes is carried out by adjusting the heating temperature and the heating time so that the oxygen content of colored titanium flakes reaches about 0.4 to about 5% by weight (preferably about 1 to about 3% by weight) and the oxide layer gains a thickness of about 100 to about 1000 Å.

The colored titanium flakes according to the third invention are usually in the form of a powder having a very low apparent density like the flakes of the second invention. When required, the dispersibility of flakes can be improved by adsorbing a surfactant on their surface. To facilitate handling, the flakes may be kneaded with an organic solvent such as mineral spirits to form a paste.

The colored titanium flakes of the third invention are especially suitable, for example, as a coloring component for a resinous molding.

The resin composition containing the colored titanium flakes of the third invention usually further contains resins, pigments and/or dyes, additives and the like as is the case with the colored titanium flakes of the second invention.

The amount of the colored titanium flakes according to the third invention in the resin composition is selected depending on the purpose of the resin composition. The amount is not specifically limited and is usually about 0.5 to about 20% by weight based on the weight of the composition. Too large an amount of titanium flakes reduces the properties of the resin composition used for the intended purpose.

The colored titanium flakes according to the present invention are vividly colored owing to the oxide layer capable of developing a color such as gold, blue, purple or the like by coherence. The color thus developed shows an excellent metallic gloss which is not lost for a long time.

A resin composition containing the colored titanium flakes of the present invention, and an ink formulation, coating formulation, etc. containing such resin composition contributes to development of vivid colors and to formation of excellent metallic luster, consequently to production of high decorating effect.

The colored titanium flakes of the second invention are suitable in wide applications for coating compositions, ink compositions and the like or for use as kneaded with a resin. The colored titanium flakes of the third invention as kneaded with a resin are particularly suitable for use.

EXAMPLES

The present invention will be described below in greater detail with reference to the following examples and comparative examples.

Example 1

A ball mill of 500 mm in diameter loaded with 50 kg of steel balls of 8 mm in diameter was charged with 1 kg of atomized titanium particles under 45 μm in particle size, 5 liters of mineral spirit and 25 g of oleic acid (1:22.5:0.1 in volume ratio). The mixture was ground at a revolution of 60 rpm (critical revolution=60 rpm) for 14 hours. In this case, calculation according to the equation (1) is as follows.

$$14 \times (60/60) \times (50/1) = 700$$

The obtained flaky titanium powder was washed with mineral spirit and sifted through a screen with an opening of 45 μm. The titanium flakes having passed the screen were filtered and dried. These titanium flakes were substantially free from fracture and flattened without breakage and had a flat, smooth surface. The titanium flakes had an average particle size of 19 μm as determined by laser diffraction and an average thickness of 0.9 μm as calculated from the hiding power.

Subsequently, a 10 g portion of the obtained titanium flakes was charged into a porous alumina container (porosity 35%, pore size about 2 μm). The container was placed into a closed type furnace (7.5 liters in volume, oxygen-nitrogen atmosphere containing 0.4 g of oxygen). The contents were heated at 440° C. for 6 hours to give titanium flakes of uniformly colored blue. The obtained blue titanium flakes had an oxygen content of 2.1% by weight, a nitrogen content of 0.04% by weight and a specific surface area of 0.39 m²/g. The oxide layer of the blue titanium flakes in the form of anatase is 345 Å in the thickness as calculated from the oxygen content and the specific surface area. The oxide layer of the blue titanium flakes had a thickness of 400 Å as measured based on the element distribution in the direction of depth by Auger electron spectroscopy (AES).

Examples 2 to 4

The same procedure as in Example 1 was repeated with the exception of changing the oxygen content in the atmosphere of the furnace for heating the titanium flakes.

Table 1 below shows the relationship of the oxygen content in the atmosphere with the color of the obtained titanium flakes, oxygen content of flakes, nitrogen content thereof and the thickness of the oxide layer (Å).

TABLE 1

| | Oxygen | | Content (wt %) | | Thickness of oxide layer | |
|---|---|---|---|---|---|---|
| | content in furnace | Color | Oxygen | Nitrogen | Calculated value | AES |
| Example 2 | 0.2 | Gold | 1.1 | 0.02 | 175 | 180 |
| Example 3 | 0.3 | Reddish purple | 1.5 | 0.03 | 230 | 250 |
| Example 4 | 0.5 | Green | 2.7 | 0.05 | 430 | 500 |

As apparent from the results shown in Table 1, the thickness of the oxide layer is controlled by adjusting the oxygen content in the atmosphere of the heated furnace, whereby the titanium flakes having the desired color can be produced.

Comparative Example 1

A ball mill of 500 mm in diameter loaded with 50 kg of steel balls of 8 mm in diameter was charged with 1 kg of atomized titanium particles under 45 μm in particle size, 1 liter of mineral spirit and 25 g of oleic acid (1:4.5:0.1 in volume ratio). The mixture was ground at a revolution of 60 rpm for 14 hours.

The obtained flaky titanium powder was washed out with mineral spirit and sifted through a screen with an opening of 45 μm. The particles having passed the screen were filtered and dried.

Figure 2:
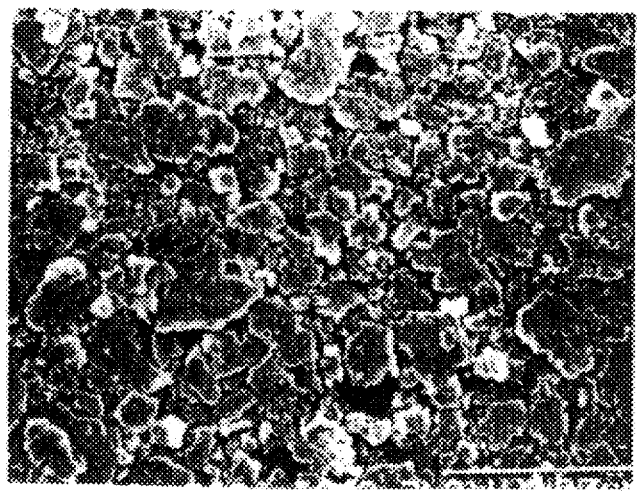
FIG. 2 is a scanning electron microphotograph showing the shape of flaky titanium obtained in Comparative Example 1 and the state of its surface.

The titanium flakes were partially torn off and had an uneven surface as apparent from FIG. 2 (scanning electron microphotograph). The titanium flakes had an average thickness of 0.2 μm as calculated from the hiding power.

Subsequently, a 10 g portion of the obtained titanium flakes was charged into a porous container (the same material for the container, the same porosity and the same pore size as the container used in Example 1). The container was placed into a closed type furnace (a volume of 7.5 liters, an oxygen-nitrogen atmosphere containing 1.4 g of oxygen). The contents were heated at 440° C. for 6 hours. The obtained titanium flakes were scarcely colored.

The obtained titanium flakes had an oxygen content of 5.6% by weight, and a nitrogen content of 0.22% by weight.

Example 5

A ball mill of 500 mm in diameter loaded with 50 kg of steel balls of 8 mm in diameter was charged with 0.5 kg of atomized titanium particles under 45 μm in particle size, 2.5 liters of mineral spirit and 25 g of oleic acid (1:22.5:0.2 in volume ratio). The mixture was ground at a revolution of 60 rpm for 14 hours.

The obtained flaky titanium powder was washed out with mineral spirit and sifted through a screen with an opening of 45 μm. The particles having passed the screen were filtered and dried.

Figure 3:
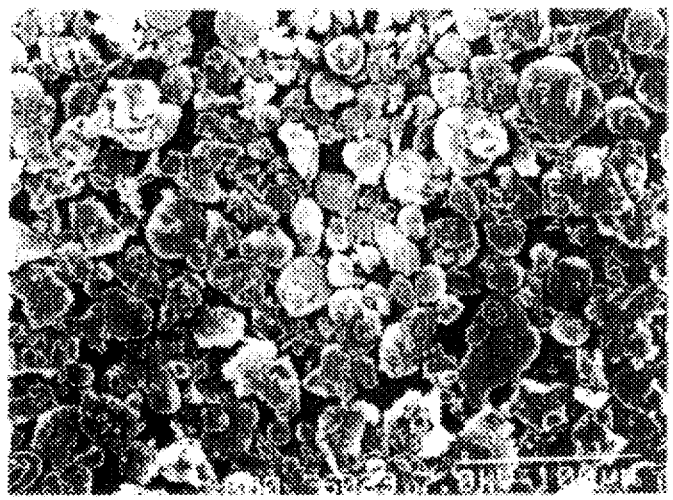
FIG. 3 is a scanning electron microphotograph showing the shape of flaky titanium obtained in Example 5 and the state of its surface.

The obtained titanium flakes were substantially free from fracture and flattened without breakage and had a flat, smooth surface as apparent from FIG. 3 (scanning electron microphotograph). The titanium flakes had an average thickness of 0.4 μm as calculated from the hiding power.

Subsequently, a 10 g portion of the obtained titanium flakes was charged into a porous container (the same material for the container, the same porosity and the same pore size as the container used in Example 1). The container was placed into a closed type furnace (a volume of 7.5 liters, an oxygen-nitrogen atmosphere containing 0.4 g of oxygen). The contents were heated at 440° C. for 6 hours. The obtained titanium flakes were uniformly colored purple. The purple titanium flakes had an oxygen content of 3.8% by weight, a nitrogen content of 0.10% by weight and a specific surface area of 0.90 m$^2$/g. The oxide layer of the purple titanium flakes in the form of anatase is 270 Å in the thickness as calculated from the oxygen content and the specific surface area. The thickness of the oxide layer was 270 Å when measured based on the element distribution in the direction of depth by Auger electron spectroscopy (AES).

Comparative Example 2

The procedure of Comparative Example 1 was followed with the exception of grinding the atomized titanium flakes for 2 hours. The obtained titanium flakes had an average thickness of 2 μm.

Subsequently, a 10 g portion of the obtained titanium flakes was charged into a porous container (the same material for the container, the same porosity and the same pore size as the container used in Example 1). The container was placed into a closed type furnace (a volume of 7.5 liters, an oxygen-nitrogen atmosphere containing 0.2 g of oxygen). The contents were heated at 440° C. for 6 hours. The obtained titanium flakes were uniformly colored blue and had an oxygen content of 0.9% by weight, and a specific surface area of 0.17 m$^2$/g.

Example 6

A 5 g portion of the blue titanium flakes obtained in Example 1 was admixed with 80 g of thermosetting acrylic resin varnish (solids 50%) and 20 g of melamine resin varnish (solids 60%). The mixture was dispersed by a stirrer to obtain a metallic coating composition.

The above obtained metallic coating composition was allowed to stand at room temperature for a week. A thinner was added to the composition and re-dispersed by a stirrer, giving a diluted coating composition. The diluted composition was applied to a bonderized steel panel by an air spray and baked at 150° C. for 30 minutes.

The resulting coated steel panel was vividly blue and had a characteristic metallic luster which shows different colors when viewed from different directions.

Comparative Example 3

A 5 g portion of the titanium flakes obtained in Comparative Example 2 was admixed with 80 g of thermosetting acrylic resin varnish (solids 50%) and 20 g of melamine resin varnish (solids 60%). The mixture was dispersed by a stirrer to obtain a metallic coating composition.

A thinner was added to the metallic coating composition and the mixture was re-dispersed by a stirrer, giving a diluted coating composition. The diluted composition was applied to a bonderized steel panel by an air spray and baked at 150° C. for 30 minutes.

The resulting coated steel panel was blue and low in the hiding power, and was neither brilliant in color nor satisfactory in metallic luster.

As done in Example 6, the obtained metallic coating composition was allowed to stand at room temperature for a week. Thereafter a thinner was added to the composition in an attempt at re-dispersion using a stirrer, but re-dispersion was difficult because the precipitate formed hard cake.

Example 7

A 3 g portion of the golden titanium flakes obtained in Example 2 was admixed with 100 g of polyethylene. The mixture was injection-molded. The obtained molded product assumed a vividly gold color and gave a characteristic metallic luster.

Comparative Example 4

A 10 g portion of titanium flakes prepared in the same manner as in Example 1 but non-oxidized was heated at 440° C. in the air for 6 hours.

The obtained oxidized titanium flakes had an oxygen content of 7.5% and the thickness of the oxide layer was 1200 Å. The oxidized titanium flakes were unevenly colored pale blue and poor in metallic gloss and contained agglomerates formed presumably due to rapid oxidation reaction.

Comparative Example 5

A ball mill of 500 mm in diameter loaded with 50 kg of steel balls of 8 mm in diameter was charged with 0.5 kg of atomized titanium particles under 45 μm in particle size, 2.5 liters of mineral spirit and 25 g of oleic acid (1:22.5:0.2 in volume ratio). The mixture was ground at a revolution of 60 rpm for 20 hours.

The obtained flaky titanium powder was washed out with mineral spirit and sifted through a screen with an opening of 45 μm. The particles having passed the screen were filtered and dried.

The obtained titanium flakes were flat and smooth-surfaced but locally fractured and had a specific surface area of 1.5 m$^2$/g.

Subsequently, a 10 g portion of the obtained titanium flakes was charged into a porous container (the same in the material for the container, porosity and pore size as the container used in Example 1). The container was placed into a closed type furnace (a volume of 7.5 liters, an oxygen partial pressure of 0.37 atm. in a normal state). The contents were heated at 440° C. for 6 hours.

11

The obtained titanium flakes were solidified owing to rapid reaction and had unevenly multi-colored portions having gold, blue and like colors.

Comparative Example 6

A 3 g portion of the titanium flakes obtained in Comparative Example 2 was admixed with 100 g of polyethylene. The mixture was injection-molded. The obtained molded product had substantially no metallic luster and displayed no distinctive feature.

Comparative Example 7

An attempt was made to oxidize titanium flakes in the same manner as in Example 1 with the exception of using a container of sintered alumina (porosity less than 1%).

The oxidized titanium flakes were blue in a surface portion but pale gold in a bottom portion, namely significantly irregular in color as a whole.

Example 8

A ball mill of 500 mm in diameter loaded with 50 kg of steel balls of 8 mm in diameter was charged with 1 kg of atomized titanium particles under 45 μm in particle size, 5 liters of mineral spirit and 25 g of oleic acid (1:22.5:0.1 in volume ratio). The mixture was ground at a revolution of 60 rpm (critical revolution=60 rpm) for 4 hours. In this case, calculation according to the equation (2) is as follows.

$$4 \times (60/60) \times (50/1) = 200$$

The obtained flaky titanium powder was washed out with mineral spirit and sifted through a screen with an opening of 45 μm. The particles having passed the screen were filtered and dried.

The obtained titanium flakes resembled those shown in FIG. 1 in shape and were substantially free from fracture. The titanium flakes had a flat, smooth surface and were flattened without breakage. The flakes were 40 μm in the average particle size as determined by laser diffraction and 2.7 μm in the average thickness as calculated from the hiding power.

Subsequently, a 10 g portion of the obtained titanium flakes was charged into a porous alumina container (porosity 35%, pore size about 2 μm). The container was placed into a closed type furnace (7.5 liters in volume, oxygen-nitrogen atmosphere containing 0.1 g of oxygen). The contents were heated at 440° C. for 6 hours to give titanium flakes uniformly colored blue. The obtained blue titanium flakes had an oxygen content of 0.7% by weight, a nitrogen content of 0.04% by weight and a specific surface area of 0.13 m²/g. The oxide layer of the blue titanium flakes in the form of anatase is 345 Å in the thickness as calculated from the oxygen content and the specific surface area. The thickness of the oxide layer was 380 Å when measured based on the element distribution in the direction of depth by Auger electron spectroscopy (AES).

Examples 9 to 11

The same procedure as in Example 8 was repeated with the exception of altering the oxygen content in the atmosphere of the furnace for heating the titanium flakes.

Table 2 below shows the relationship of the oxygen content in the atmosphere with the color of the obtained colored titanium flakes, oxygen content of the flakes, nitrogen content thereof and the thickness of the oxide layer (Å).

12

TABLE 2

| | Oxygen content in furnace | Color | Content (wt %) Oxygen | Nitrogen | Thickness of oxide layer Calculated value | AES |
|---|---|---|---|---|---|---|
| Example 9 | 0.05 | Gold | 0.4 | 0.02 | 197 | 210 |
| Example 10 | 0.15 | Reddish purple | 0.5 | 0.03 | 246 | 260 |
| Example 11 | 0.2 | Green | 0.9 | 0.05 | 443 | 470 |

As apparent from the results shown in Table 2, the thickness of the oxide layer is controlled by adjusting the oxygen content in the atmosphere of the heated furnace, whereby the titanium flakes having the desired color can be obtained.

Comparative Example 8

A ball mill of 500 mm in diameter loaded with 50 kg of steel balls of 8 mm in diameter was charged with 1 kg of atomized titanium particles under 45 μm in particle size, 1 liter of mineral spirit and 25 g of oleic acid (1:4.5:0.2 in volume ratio). The mixture was ground at a ball mill revolution of 60 rpm for 0.5 hour.

The obtained flaky titanium powder was washed out with mineral spirit and sifted through a screen with an opening of 45 μm. The particles having passed the screen were filtered and dried.

The obtained titanium flakes were neither sufficiently expanded nor fully flat in the surface. The titanium flakes had an average thickness of 15 μm as calculated from the hiding power and an average particle size of 25 μm.

Subsequently, a 10 g portion of the obtained titanium flakes was charged into a porous container (the same material for the container, the same porosity and the same pore size as the container used in Example 1). The container was placed into a closed type furnace (a volume of 7.5 liters, an oxygen-nitrogen atmosphere containing 1.4 g of oxygen). The contents were heated at 440° C. for 6 hours. The obtained titanium flakes were substantially not colored. The flakes had an oxygen content of 0.3% by weight, and a nitrogen content of 0.22% by weight.

Example 12

A ball mill of 500 mm in diameter loaded with 50 kg of steel balls of 8 mm in diameter was charged with 0.5 kg of atomized titanium particles under 45 μm in particle size, 2.5 liters of mineral spirit and 25 g of oleic acid (1:22.5:0.2 in volume ratio). The mixture was ground at a revolution of 60 rpm for 14 hours.

The obtained flaky titanium powder was washed out with mineral spirit and sifted through a screen to select flakes of 37–74 μm in particle size. The separated particles were filtered and dried.

The obtained titanium flakes were similar in shape to those shown in FIG. 3, flattened without breakage and substantially free from fracture and had a flat, smooth surface. The titanium flakes had an average particle size of 70 μm and an average thickness of 3.5 μm as calculated from the hiding power.

Subsequently, a 10 g portion of the obtained titanium flakes was charged into a porous container (the same material for the container, the same porosity and the same pore size as the container used in Example 1). The container was placed into a closed type furnace (a volume of 7.5 liters, an oxygen-nitrogen atmosphere containing 0.1 g of oxygen).

The contents were heated at 440° C. for 6 hours, thereby producing titanium flakes of uniformly colored purple. The obtained purple titanium flakes had an oxygen content of 0.5% by weight, a nitrogen content of 0.10% by weight and a specific surface area of 0.1 m²/g. The oxide layer of the blue titanium flakes in the form of anatase is 320 Å in the thickness as calculated from the oxygen content and the specific surface area. The thickness of the oxide layer was 310 Å when measured based on the element distribution in the direction of depth by Auger electron spectroscopy (AES).

Comparative Example 9

The procedure of Comparative Example 8 was followed with the exception of grinding the atomized titanium powder under 200 µm in average particle size for 2 hours. The obtained titanium flakes had an average particle size of 1500 µm and an average thickness of 15 µm.

Subsequently, a 10 g portion of the obtained titanium flakes was charged into a porous container (the same material for the container, the same porosity and the same pore size as the container used in Example 1), and the container was placed into a closed type furnace (a volume of 7.5 liters, an oxygen-nitrogen atmosphere containing 0.2 g of oxygen). The contents were heated at 440° C. for 6 hours.

The obtained titanium flakes had an oxygen content of 1.9% by weight, and a specific surface area of 0.06 m²/g. The oxide layer of the titanium flakes was 2050 Å in the thickness as calculated from the oxygen content and the specific surface area. The obtained titanium flakes had a faint purple color but a poor metallic luster.

Example 13

A 5 g portion of the blue titanium flakes obtained in Example 8 was admixed with 100 g of ABS resin. The mixture was injection-molded. The obtained molded product was vividly blue and had a characteristic metallic luster which shows different colors when viewed from different directions.

Comparative Example 10

A 5 g portion of the titanium flakes obtained in Comparative Example 8 was admixed with 100 g of ABS resin. The mixture was injection-molded. The obtained molded product was low in metallic luster and had a flow pattern that remarkably deteriorated the appearance of the product.

Comparative Example 11

A 3 g portion of the golden titanium flakes obtained in Comparative Example 8 was admixed with 100 g of polyethylene. The mixture was injection-molded. The obtained molded product was low in metallic luster and thus had a poor appearance.

Example 14

A 3 g portion of the golden titanium flakes obtained in Example 9 was admixed with 100 g of polyethylene. The mixture was injection-molded. The obtained molded product showed a vividly golden color and produced a characteristic metallic luster.

Comparative Example 12

A 3 g portion of the titanium flakes obtained in Comparative Example 9 was admixed with 100 g of polyethylene. The mixture was injection-molded. The obtained molded product was low in metallic luster and had such a rough surface due to the projections of titanium flakes that the appearance of the product was markedly impaired.

What we claim is:

1. A colored titanium flake having a flat, smooth surface which is oxidized to a depth of 100 to 1000 Å, said colored titanium flake having an average thickness of 0.1 to 1.0 µm and an average particle size of 5 to 50 µm.

2. A colored titanium flake according claim 1 which has an oxygen content of 1 to 5% by weight, a nitrogen content of up to 0.2% by weight, and a specific surface area of 0.2 to 1.0 m²/g.

3. A process for preparing the colored titanium flakes of claim 1, comprising the steps of:
    placing titanium flakes with a flat, smooth surface into a porous refractory container having a porosity of 15 to 60% with a pore size of 0.5 to 10 µm, said flakes having a specific surface area of 0.2 to 1.0 m²/g; and
    heating said flakes at 250° C. to 500° C. in an atmosphere having a partial pressure of oxygen adjusted to 0.01 to 0.15 atm., for a time sufficient to oxidize the flat, smooth surface of said flakes to a depth of 100 to 1000 Å.

4. A Resin composition comprising the colored titanium flakes of claim 1.

5. A colored titanium flake having a flat, smooth surface which is oxidized to a depth of 100 to 1000 Å, said colored titanium flake having an average thickness of 1 to 10 µm, an average particle size of 10 to 1000 µm, and an aspect ratio of from 2 to 50.

6. A colored titanium flake according to claim 5 which has an oxygen content of 0.4 to 5% by weight, a nitrogen content of up to 0.2% by weight, and a specific surface area of 0.05 to 0.5 m²/g.

7. A process for preparing the colored titanium flakes claim 5, comprising the steps of;
    placing titanium flakes with a flat, smooth surface into a porous refractory container having a porosity of 15 to 60% with a pore size of 0.5 to 10 µm, said flakes having a specific surface area of 0.05 to 0.5 m²/g; and
    heating said flakes at 250° C. to 500° C. in an atmosphere having a partial pressure of oxygen adjusted to 0.01 to 0.15 atm., for a time sufficient to oxidize the flat, smooth surface of said flakes to a depth of 100 to 1000 Å.

8. A resin composition comprising the colored titanium flakes of claim 5.

9. A resin composition according to claim 4, wherein said colored titanium flakes have an oxygen content of 1 to 5% by weight, a nitrogen content of up to 0.2% by weight, and a specific surface area of 0.2 to 1.0 m²/g.

10. A resin composition according to claim 4, wherein the colored titanium flakes are present in the resin composition in an amount of 0.5 to 20% by weight.

11. A resin composition according to claim 8, wherein said colored titanium flakes have an oxygen content of 0.4 to 5% by weight, a nitrogen content of up to 0.2% by weight, and a specific surface area of 0.05 to 0.5 m²/g.

12. A resin composition according to claim 8, wherein the colored titanium flakes are present in the resin composition in an amount of 0.5 to 20% by weight.

13. A method for coloring a resin composition, comprising mixing the colored titanium flakes of claim 1 with a resin composition in an amount sufficient to color said resin composition.

14. A method according to claim 13, wherein said resin composition is selected from the group consisting of a molding composition, a coating composition, and an ink composition.

15. A method for coloring a resinous composition, comprising mixing the colored titanium flakes of claim 5 with a resinous composition in an amount sufficient to color said resinous composition.

* * * * *